May 8, 1923.
J. B. MOORE
1,454,451
TOOL AND METHOD OF MAKING THE SAME
Filed June 3, 1919
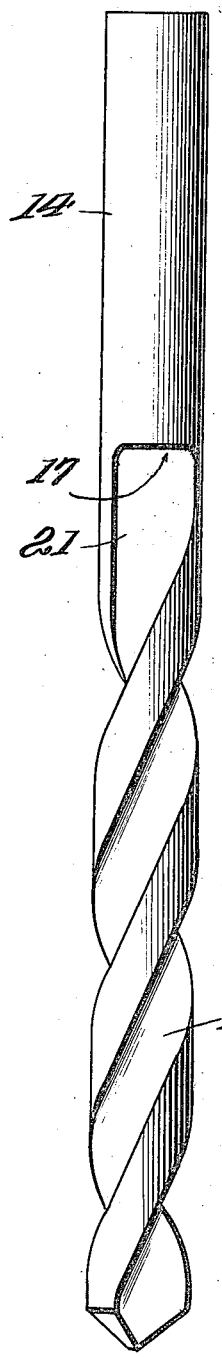
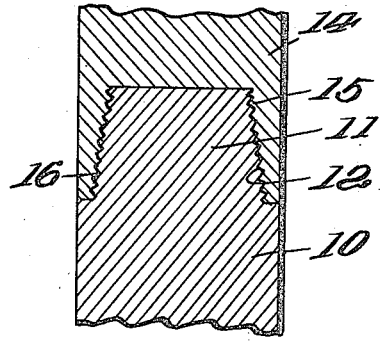
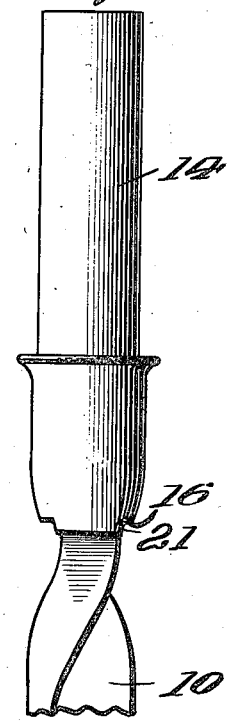
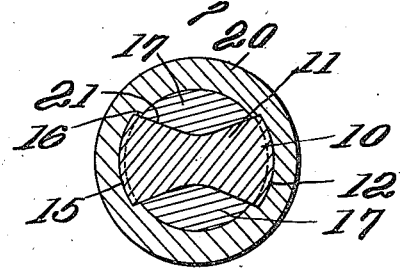
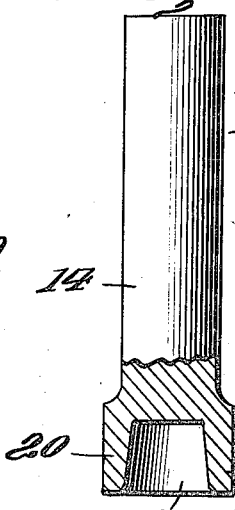
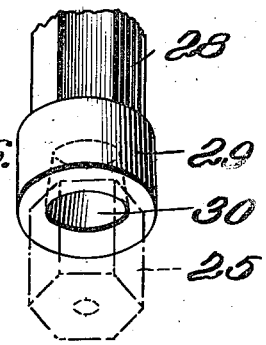
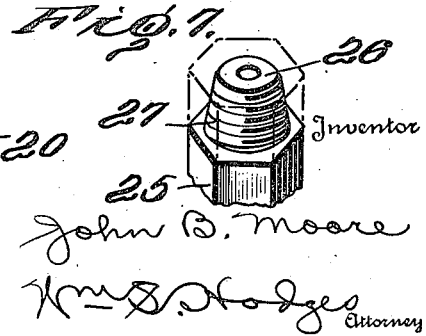

Patented May 8, 1923.

1,454,451

UNITED STATES PATENT OFFICE.

JOHN B. MOORE, OF LATROBE, PENNSYLVANIA.

TOOL AND METHOD OF MAKING THE SAME.

Application filed June 3, 1919. Serial No. 301,437.

*To all whom it may concern:*

Be it known that I, JOHN B. MOORE, a citizen of the United States, residing at Latrobe, in the county of Westmoreland and State of Pennsylvania, have invented a new and useful Tool and Method of Making the Same, of which the following is a specification.

This invention is a tool of the type which is made up of a tool body of high speed metal united to a shank of low grade metal.

Owing to the excessive cost of high speed steel, it is desirable to utilize metal of a lower grade for the construction of the shank of the tool in order to reduce the cost of manufacture. Heretofore many attempts have been made to produce a tool of this type, which attempts have been more or less successful so far as the initial uniting of the parts is concerned, but the problem of uniting high speed steel to low grade metal is a difficult one and as a consequence tools constructed in this manner are frequently too weak at the joint to stand up to working requirements, or else the expense of manufacture is relatively high.

One of the objects of the invention is to provide a tool of the character referred to in which a high speed steel body is united to a shank of low grade metal, by a process which integrally unites the parts so that they are stronger at their point of union than elsewhere. A further object is to provide a simple process by which the high speed body may be united to the low grade shank by a series of steps which will insure a perfect union between the parts and which will materially reduce the cost of manufacture. A further object is to provide a method of uniting the parts in which the process of metal spinning or rolling may be utilized.

The invention will be hereinafter fully set forth and particularly pointed out in the claims.

In the accompanying drawing:—

Figure 1 is a side elevation illustrating a twist drill constructed in accordance with the invention. Figure 2 is a longitudinal sectional view illustrating the joint. Figure 3 is a transverse sectional view illustrating the joint. Figure 4 is a longitudinal sectional view of the shank before the parts are united. Figure 5 is a side view illustrating the parts after uniting and before finishing. Figures 6 and 7 are views illustrating a slight modification.

Referring to the drawing 10 designates the high speed steel body of a twist drill which may be of any desired type, having its shank end 11 preferably tapered, and provided with interrupted screw threads or transverse shoulders 12. A twist drill has been selected for illustrative purposes but it is to be understood that the invention is not limited to this particular type of tool but may be applied to any tool in which a member of high grade metal is attached to a member of low grade metal. The shank 14 of the completed tool is provided at the tool end with a socket 15 of a shape and diameter to receive the reduced portion 11 of the tool, the internal wall of the socket being distorted or pressed inwardly against the flat longitudinally grooved sides of the tool body, as indicated at 16, (Figure 3) and into the grooves of the transverse threads or shoulders 12. As a refinement it is preferred, although not necessary, to employ a brazing material 17 to aid in uniting the tool body and the shank, said brazing material being applied in such a manner that it will flow between the wall of the socket and the threads or shoulders 12, thereby insuring a perfect integral joint.

In the process of manufacture the high speed body is formed with the reduced portion 11 and the threads or shoulders 12, as above described. The shank however, is provided with an enlarged socket end 20 (see Figure 4) which is of considerably greater diameter than the main body of the shank. After heating the socket to a sufficiently high temperature to soften it, the reduced portion 11 of the tool body is inserted into the socket 20. The shank is then supported in a chuck while the pointed end of the tool body is supported in a well known manner by a center, so that the two members are supported in a manner to be rotated in perfect alignment and without longitudinal play. The heated socket 20 is then engaged by a suitable tool provided with a rounded end of high speed metal or other heat resisting metal, which acts upon the heated metal of the shank in a manner well known in the art of spinning metal. The friction generated by the spinning method maintains the metal at a sufficiently high temperature to keep it soft, and the effect of the spinning action is to distort the inner wall of the socket so as to force it into the longitudinal grooves 21 of the tool body 10 and into the transverse grooves 12, thereby interlocking the socket and the tool body 10, the internal wall of the socket being distorted or pressed inwardly so as to interlock with the threads or shoulders 12, as clearly illustrated in full lines in Figure 2, and in dotted lines in Figure 3. At the same time portions of said inner wall of the socket are caused to overlap the flat sides of the tool body 10, thereby interlocking the socket and body, as clearly illustrated in Figure 3, and indicated by the ordinal 16. It will be understood that during the spinning or pressing operation the shank is supported by a chuck and the tool by a center, and the spinning tool co-operates with said supporting elements to hold the parts in alignment so that when they are united they are absolutely true. The effect of the spinning operation is not only to interlock the shank with the tool as indicated at 16 but it also forces the inner wall of the socket into the spaces between the shoulders or threads 12 thereby giving an absolute integral union, and this union is made more perfect by the shrinkage of the socket around the inserted end of the tool body when the metal cools. The external effect of the spinning operation is to form an annular flange or fin as shown in Figure 5. This is dressed off in any desired manner. While it is preferred to distort the socket by the spinning process the same result may be obtained by using one or more rollers or by swaging operations.

In constructing mining drills which are usually, although not always made of hexagonal stock with a central bore, it is preferred to taper the shank end of the tool body 25, as indicated at 26, and to provide the same with transverse threads or shoulders 27. The shank 28 is made of similar stock, one end being upset to provide an enlarged socket portion 29. This stock is usually provided with a small central bore, and in the manufacture of the drill according to the present invention this bore at the socket end is reamed out or enlarged as indicated at 30, to conform to the taper 26. The two parts are then engaged in the manner already described and united by the spinning operation above set forth, in connection with the twist drill form of the invention. The transverse shoulders 27 are gashed longitudinally to provide interstices for the upset metal of the shank, whereby relative rotation is prevented.

No matter of what form the tool may be, after the parts are united by either of the methods above outlined, the surplus metal of the socket is removed in any suitable manner to produce the finished tool, i. e. one in which the diameter of the socket is approximately the same as the maximum transverse diameter of the tool body which is then ground and polished in the usual way well known in the art.

Having thus explained the nature of the invention, and described an operative manner of constructing the same, although without attempting to set forth all of the forms in which it may be made, or all of the forms of its use, what is claimed is:—

1. A method of producing tools comprising providing a high speed tool body with a reduced end having transverse shoulders, inserting the shouldered portion into a socket of low grade material, rotating the engaged body and socket, applying pressure to the socket during the rotation of the parts to force the internal surface thereof into the spaces between said shoulders, and continuing the pressure until the socket is reduced to the approximate maximum transverse diameter of the tool body.

2. A method of producing tools comprising providing a high speed tool body with a tapered end having transverse shoulders, inserting the shouldered portion into a correspondingly tapered socket of low grade material, rotating the engaged body and socket, applying pressure to the socket during rotation of the parts to force the internal surface thereof into the spaces between said shoulders, and continuing the pressure until the socket is reduced to the approximate maximum transverse diameter of the tool body.

3. A method of producing tools comprising providing a high speed tool body of angular cross section with a reduced end, inserting said reduced end into a socket of circular cross section, rotating the engaged body and socket, applying pressure to the socket during rotation of the parts to force the internal surface thereof partially around the angular faces of said tool body and continuing the pressure until the socket is reduced to the approximate maximum transverse diameter of the tool body.

4. A method of producing tools comprising providing a high speed tool body of angular cross section with transverse shoulders at one end, inserting the shouldered end into a low grade metal socket of circular cross section, and rotating the engaged body and socket, applying pressure to the socket during rotation of the parts to force the internal surface thereof into engagement with said shoulders and partially around the angular faces of the tool body and continuing the pressure until the socket is reduced to the approximate maximum transverse diameter of the tool body.

5. A method of producing tools comprising providing a high speed steel body of angular cross section having a tapered reduced end provided with transverse shoulders, inserting the tapered end into a socket of low grade metal, and rotating the engaged body and socket, applying pressure to the socket during rotation of the parts to force the internal surface thereof into the spaces between said shoulders and continuing the pressure until the socket is reduced to the approximate maximum transverse diameter of the tool body.

6. A method of producing tools comprising providing a high speed tool body of angular cross section with a reduced tapered end, inserting the tapered end into a complemental socket of low grade metal, and finally rotating the engaged body and socket, applying pressure to the socket during rotations of the parts to force the internal surface thereof into engagement with said shoulders and partially over the angular faces of the tool body and continuing the pressure until the socket is reduced to the approximate maximum transverse diameter of the tool body.

7. A method of producing tools comprising providing a tool body with transverse and longitudinal interlock portions at one end, inserting said end into a socket, imparting rotation to the engaged tool body and socket, and forcing the inner portion of the socket into engagement with the interlock portions by pressure applied during said rotation.

8. A method of producing tools comprising providing a tool body with interrupted transverse interlock portions simulating screw threads, inserting said end into a socket having a smooth inner wall, imparting rotation to the engaged tool body and socket, and applying pressure during such rotation until the inner wall of the socket is forced into engagement with the depressions formed by said interrupted screw threads.

9. A method of producing tools comprising providing the edges of a tool body of angular cross section with interrupted screw threads, inserting the threaded end of said tool body into a socket having a smooth inner wall, imparting rotation to the engaged tool body and the socket, and forcing the inner portion of the socket into engagement with said threads and around the edges of said tool body by pressure during such rotation.

10. A method of producing tools comprising providing a high speed tool body of angular cross section with transverse shoulders at one end, inserting the shouldered end into a socket of low grade metal, rotating the engaged body and socket, and finally applying pressure to the socket during rotation of the parts to force the internal surface thereof into engagement with said shoulders and partially around the angular faces of the tool body and applying brazing material to the joint and causing it to flow between said shoulders.

11. A method of producing tools comprising inserting a reduced end of a high speed metal tool body into a complemental socket of low grade metal, rotating the engaged body and socket and applying pressure to the socket during rotation of the parts, until the internal wall of the socket flows inwardly around the inserted portion of the tool body, and the external diameter of the socket is reduced to the approximate maximum transverse diameter of the tool body.

12. A method of producing tools comprising heating a low grade metal shank provided with a socket, inserting a high speed metal body into the socket of the shank, rotating the heated shank and body in alignment with each other, uniting the parts by pressure applied during the rotation thereof, and finally applying brazing material to the joint thus produced.

13. A tool of the character described comprising a shank provided with a socket of approximately circular cross section, a tool body having one end provided with a plurality of closely disposed shoulders simulating interrupted screw threads, the shouldered end of said tool being inserted into said socket, the inner surface of said socket having inwardly pressed portions interlocking with said shoulders and overlapping the sides of the tool body.

14. A tool of the character described comprising a shank provided with a socket of approximately circular cross section, an approximately flat tool body having the edges at one end provided with a plurality of closely disposed shoulders simulating interrupted screw threads, said shouldered end being inserted into the socket, the inner surface of said socket having inwardly pressed portions interlocking with said shoulders and overlapping the sides of the tool body.

15. A tool of the character described comprising a shank provided with a socket of approximately circular cross section, a tool body having one end tapered and provided with a plurality of closely disposed shoulders simulating interrupted screw threads, said shouldered end being inserted into said socket, the inner surface of said socket having inwardly pressed portions interlocking with said shoulders and overlapping the sides of said body.

16. A tool of the character described comprising a shank provided with a socket of approximately circular cross section, an approximately flat tool body having the edges at one end provided with a plurality of closely disposed shoulders simulating interrupted screw threads, said shouldered end being inserted into the socket, the inner surface of said socket, having inwardly pressed portions interlocking with said shoulders and overlapping the sides of the tool body, and a filling of brazing material between those portions of the socket and the tool which are not in contact.

17. A tool of the character described comprising a metal shank provided with a tapered socket, a tool body having a tapered end extending into said socket, the inner surface of said socket having inwardly pressed portions fitting around and permanently interlocking with complemental longitudinally and transversely disposed interlock portions of said inserted end, the maximum transverse diameter of said socket and of said tool body being approximately the same.

18. A tool of the character described comprising a metal shank provided with a socket, a tool body having a reduced end extending into said socket, the inner surface of the socket having inwardly pressed portions fitting around and permanently interlocked with complemental longitudinally and transversely disposed portions of the reduced end of said tool body, the maximum transverse diameter of said socket and of said body being approximately the same.

In testimony whereof I have hereunto set my hand.

JOHN B. MOORE.